June 23, 1959 K. F. JOHNSON 2,891,430
AUTOMATIC SHEARING AND COLDWELDING APPARATUS
Filed Dec. 13, 1956 3 Sheets-Sheet 1

INVENTOR
K. F. JOHNSON
BY C. B. Hamilton
ATTORNEY

June 23, 1959 K. F. JOHNSON 2,891,430
AUTOMATIC SHEARING AND COLDWELDING APPARATUS
Filed Dec. 13, 1956 3 Sheets-Sheet 2

INVENTOR
K. F. JOHNSON
BY C. B. Hamilton
ATTORNEY

June 23, 1959     K. F. JOHNSON     2,891,430
AUTOMATIC SHEARING AND COLDWELDING APPARATUS
Filed Dec. 13, 1956     3 Sheets-Sheet 3

INVENTOR
K. F. JOHNSON
BY C. B. Hamilton
ATTORNEY

United States Patent Office 2,891,430
Patented June 23, 1959

2,891,430

AUTOMATIC SHEARING AND COLDWELDING APPARATUS

Kenneth F. Johnson, Oak Lawn, Ill., assignor to Western Electric Company, Incorporated, New York, N.Y., a corporation of New York Application December 13, 1956, Serial No. 628,130

6 Claims. (Cl. 78—82)

This invention relates to automatic shearing and coldwelding apparatus, and more particularly to apparatus for shearing the ends of a pair of wires and forcing the sheared end faces of the wires together to effectuate a coldweld therebetween.

Recently, hand operated tools have been developed for forcing metallic wires of aluminum or other ductile material together to obtain a weld therebetween without the application of any external heat. In order to obtain a satisfactory weld, it is necessary that the wires be cleanly sheared at right angles prior to the welding operation. Thereafter the apparatus must exert a uniform force of considerable magnitude along the longitudinal axis of the wires to move the wires into abutting relationship to accomplish a strong weld.

It is a primary object of the present invention to provide a simple and economical apparatus for automatically shearing and coldwelding two metallic members.

Another object of the invention resides in an apparatus for sequentially gripping, shearing and coldwelding a pair of wires.

A further object of the invention is the provision of a cam unit for controlling the sequential operation of a series of component mechanisms that function (1) to move two sets of jaws to grip a pair of wires, (2) to advance a pair of shears to cleanly sever the wires, (3) to withdraw the shears and (4) to advance one set of jaws relative to the other to effectuate a coldweld between the sheared end faces of the wires.

With these and other objects in view, the present invention contemplates a fixed frame having a first pair of jaws movable into and out of a wire gripping position and a second pair of jaws also movable into and out of a wire gripping position and being further capable of movement toward a first pair of jaws. A pair of double faced shear members are provided for simultaneously severing the ends of the wires placed in both pairs of jaws. Sequential motion for the various components is obtained from a cam unit that is selectively operated to move each pair of jaws into position to grip the ends of a pair of wires that are to be coldwelded together. Continued operation of the cam unit results in the impartation of movement to the shearing members to cleanly sever at right angles the ends of the wires whereafter the cam unit withdraws the shearing members. Immediately thereupon the cam unit moves one pair of gripping jaws to advance the end face of the wire held thereby into abutting relation with the end face of the wire held by the other pair of jaws to accomplish a coldwelding operation therebetween.

Other objects and advantages of the present invention will be apparent from the following detailed description when considered in conjunction with the accompanying drawings, wherein Fig. 1 is a side elevational view of an apparatus for sequentially severing and coldwelding a pair of wires embodying the principal features of the present invention;

Figure 1:
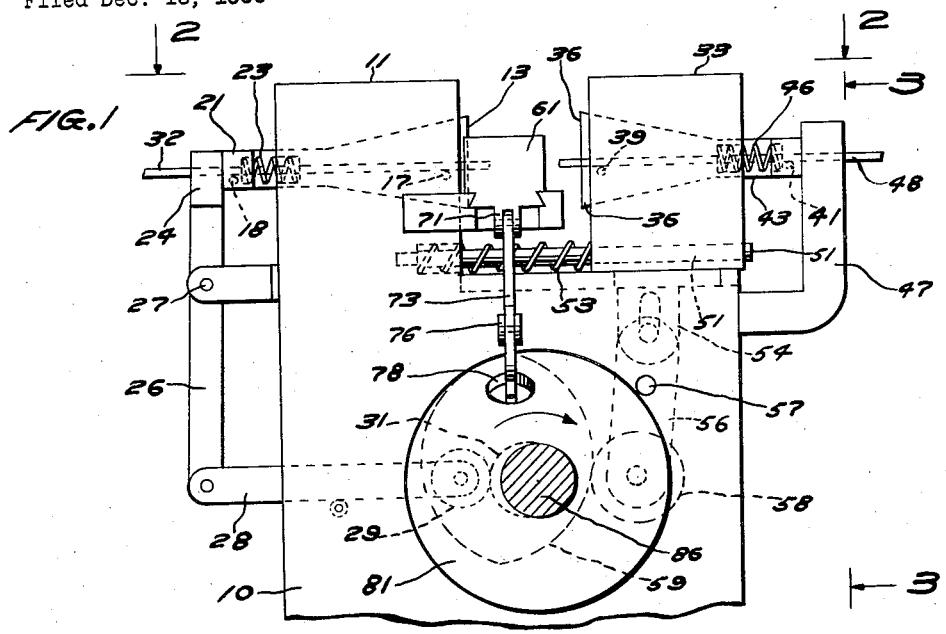
Figure 2:
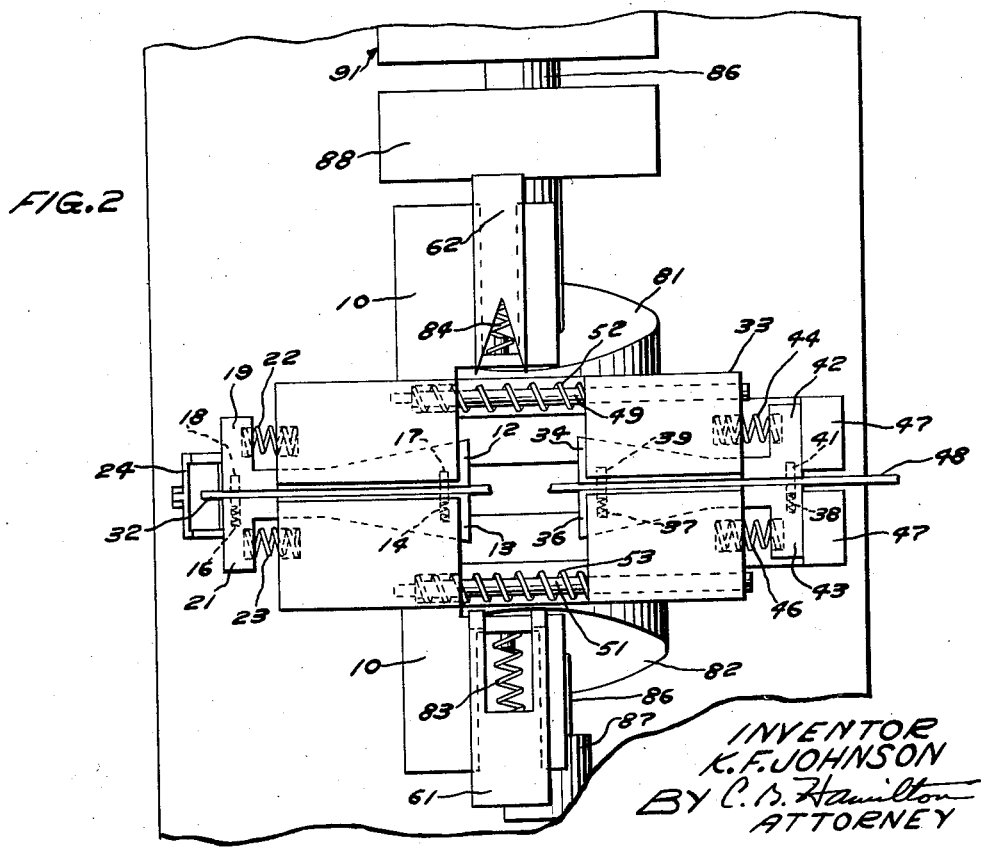
Fig. 2 is a top plan view of the apparatus shown in Fig. 1.
Figure 3:
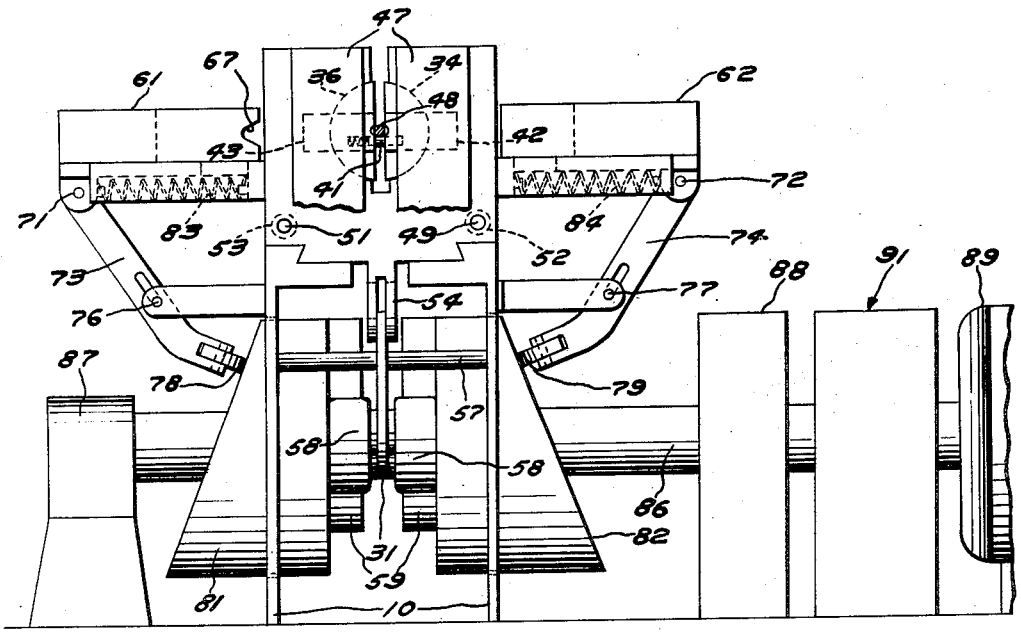
Fig. 3 is a front elevational view of the apparatus shown in Figs. 1 and 3.
Figure 6:
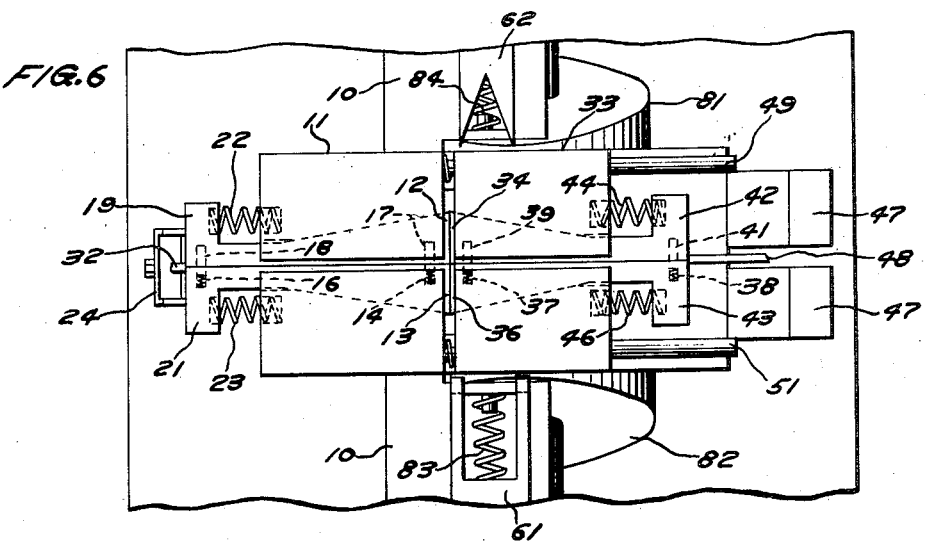
Figure 7:
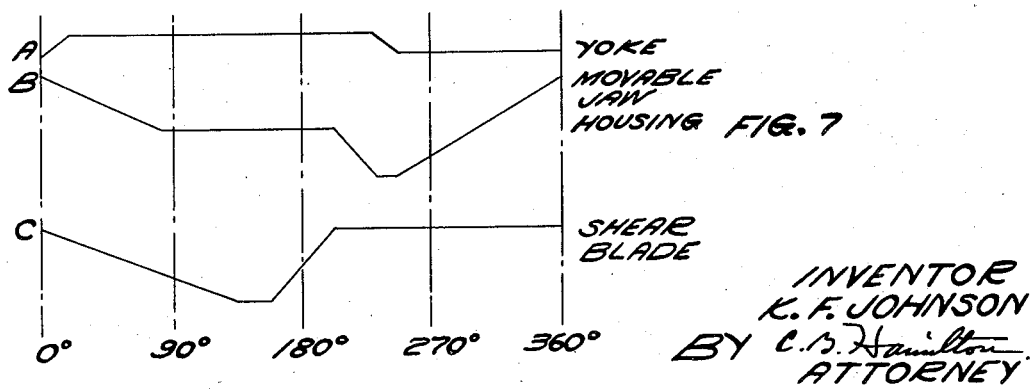

Fig. 6 is a top plan view of the apparatus shown in Figs. 1, 2 and 3 wherein the shearing members are withdrawn and a pair of gripping jaws have been moved to a position to effectuate a coldweld of the ends of a pair of wires, and Fig. 7 is a timing diagram illustrating the relative movements of the shearing mechanism with respect to the jaw gripping means during a cycle of operation of the apparatus shown in the other views.

Referring to Figs. 1, 2 and 3, there is shown a frame 10 having an extension 11 providing a stationary housing for a pair of jaws 12 and 13. The inner surface of the housing is frusto-conically shaped to cooperate with the frusto-conical peripheral surface of the jaws 12 and 13. Contact between the surface of the jaws with respect to the inner surface of the housing is maintained through the instrumentality of a pair of compression springs 14 and 16 (see Figs. 2 and 3) seated within apertures formed in the lower half of jaw member 13 acting on a pair of guide pins 17 and 18 slidably mounted within slots formed at the bottom of the grooves for accommodating a wire to be welded. The guide pins act to preclude twisting of the jaw members and also provide a seat for a wire placed between the jaw members.

The jaws 12 and 13 are provided with laterally extending extensions 19 and 21 that engage strong compression springs 22 and 23 extending from slots formed in the rear portion of the housing 11. Engaging the extensions 19 and 21 and holding the springs under compression is a yoke 24 secured to a lever 26 pivotally mounted about a stud shaft 27. The lever 26 is connected to an arm 28 having a cam follower roller 29 rotatably mounted on the free end thereof, and adapted to cooperate with a cam 31. When the roller 29 rides on the high portion of the cam 31, the lever 26 is positioned to apply a force through the yoke 24 and extensions 19 and 21 to compress the springs 22 and 23, and as a result thereof the springs 14 and 16 will force the jaws apart. When the roller moves from the high portion of the cam 31, the extensions 19 and 21 are moved by compression springs 22 and 23 to cause the jaws 12 and 13 to ride along the conical surface of the housing 11, and thus move against the action of the springs 14 and 16 into engagement with a wire 32 positioned therebetween.

Slidably mounted on the righthand portion of the frame is a second housing 33 also having a frusto-conical inner surface. A second pair of jaws 34 and 36 having frusto-conical peripheral surfaces are mounted within the housing 33. Again relatively weak compression springs 37 and 38 and guide pins 39 and 41 are provided to hold the jaw members 34 and 36 apart when in the position shown in Figs. 1, 2 and 3. Jaw members 34 and 36 are provided with lateral extensions 42 and 43 engaging a pair of compression springs 44 and 46 extending out from apertures formed in the movable housing 33. Extending from the side of the frame 10 is a stationary stop member 47 having a bifurcated upper extremity engaging the lateral extensions 42 and 43 to hold the springs 44 and 46 under compression thereby permitting the springs 37 and 38 to spread the jaws 34 and 36 apart to permit a wire 48 to be positioned within the jaws.

The movable housing 33 is mounted on a pair of guide rods 49 and 51 having mounted thereabout compression springs 52 and 53. Extending from the underside of the housing 33 is an abutment 54 having pivotally connected thereto a lever 56 that is pivotally mounted about a stud shaft 57. At the lower extremity of the lever 56 is rotatably mounted a pair of cam follower rollers 58 adapted to follow the contour of a pair of identical cams 59. When the roller 58 is positioned on the lower portion of the cam, the housing 33 is forced toward the right by the action of compression springs 52 and 53 so that the extensions 42 and 43 engage the stop arm 47. Springs 44 and 45 which are weaker than springs 52 and 53 are held compressed and the springs 37 and 38 are rendered effective to move the jaws 34 and 36 apart.

Figure 4:
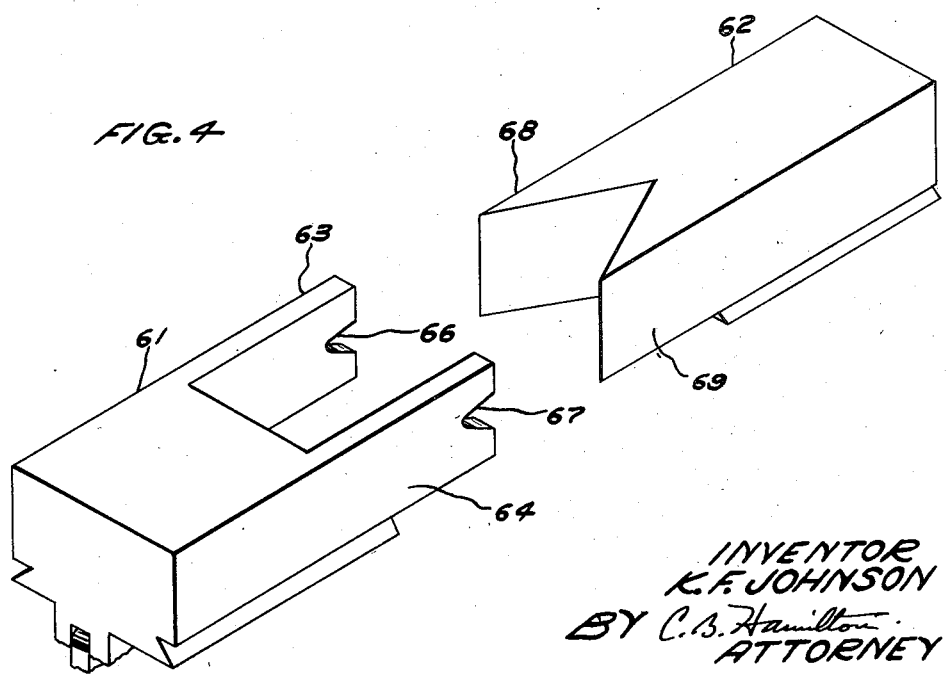
Fig. 4 is a perspective view of a pair of shearing members for simultaneously severing the ends of a pair of wires.

A pair of severing members 61 and 62 are also slidably mounted by means of a dove-tailed joint to the frame 10. Referring to Fig. 4, it will be noted that the member 61 is provided with a pair of extensions 63 and 64 having notches 66 and 67 formed therein to accommodate the ends of the wire 32 and 48. The member 62 has a pair of triangular-shaped shearing members 68 and 69 extending therefrom and adapted to fit within the extensions 63 and 64 to effectuate a severing of the wires held within the notches 66 and 67. Referring to Fig. 3, it will be noted that the underside of the members 61 and 62 are provided with the abutments 71 and 72 that are pivotally connected to a pair of levers 73 and 74 pivotally mounted about stud shafts 76 and 77. At the lower extremity of the levers 73 and 74 are rotatably mounted a pair of cam follower rollers 78 and 79 adapted to follow the contour of a pair of radial cams 81 and 82. Springs 83 and 84 are provided to maintain the rollers 78 and 79 in engagement with the respective cams 81 and 82.

It will be noted that all of the cams 31, 59, 81 and 82 are mounted about a common shaft 86 that is rotatably mounted within bushings 87 and 88. Shaft 86 is selectively interconnected with a motor 89 through the instrumentality of a one-revolution clutch generally designated by the reference numeral 91.

*Operation*

Assume that the components of the apparatus are in the position shown in Figs. 1, 2 and 3, then an attendant will insert wires 32 and 48 through slots formed in the upper extremity of the housings 11 and 33 and through the jaws 12 and 13 and the jaws 34 and 36, respectively. The wires 32 and 48 will be positioned so that a portion of each extends into the gap between the two sets of jaws. With these preparatory operations completed the one-revolution clutch 91 is tripped and rotative power is imparted to the shaft 86 to initiate a cycle of operation of the cams 31, 59, 81 and 82. As roller 29 moves from the high portion of its cam, the yoke 24 and the extensions 19 and 21 will move toward the left (see line A, Fig. 7) under the influence of the compression springs 22 and 23. The conical surfaces of the jaws 12 and 13 react against the conical surfaces of the housing 11 to force the jaws together against the action of the relatively weak compression springs 14 and 16 to securely grip the wire 32.

As this is occurring the cam follower rollers 58 ride slightly up on the high portion of the cams 59 to impart a slight counterclockwise movement to the lever 56 thereby moving the housing 33 slightly toward the left (see line B, Fig. 7). Compression springs 44 and 46 are permitted to expand and will tend to hold the extensions 42 and 43 in engagement with the fixed stop arm 47. The conical surfaces of the jaws 34 and 36 react against the inner conical surfaces of the movable housing 33 to cause the jaws to move toward each other against the action of the relatively weak compression springs 37 and 38. The wire 48 is thus securely gripped between the jaws 34 and 36. The portions of the wires 32 and 48 extending from the jaw members are positioned in register with the slots 66 and 67 formed in the severing member 61.

Figure 5:
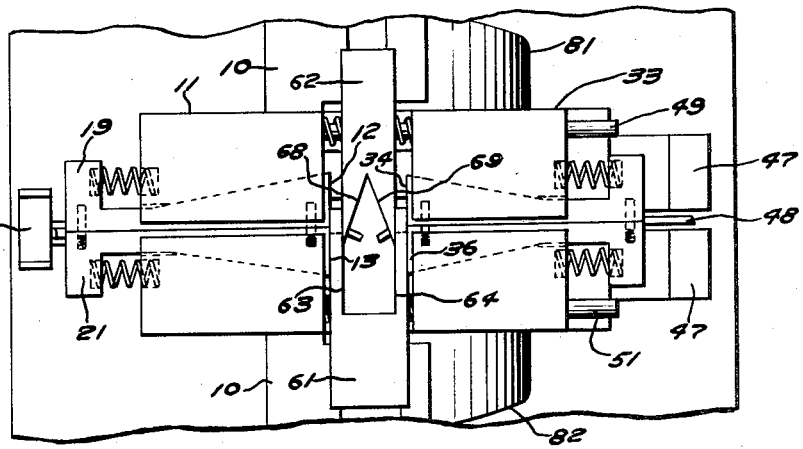
Fig. 5 is a top plan view of the apparatus shown in Figs. 1, 2 and 3 wherein the shearing members are in position to effectuate the severing of a pair of wires.

Further movement of shaft 86 causes cams 81 and 82 to present high portions thereof to the cam followers 78 and 79 thereby causing the levers 73 and 74 to pivot toward each other and thereby move the severing members 61 and 62 toward each other (see Fig. 5 and line c of Fig. 7). The extensions of the wires 32 and 48 are gripped within the notches 66 and 67 and the shearing extensions 68 and 69 of member 62 move to cleanly shear the ends of the wires. Further movement of the cams 81 and 82 results in the withdrawal of the severing members 61 and 62.

Cams 59 now present lobes of greater radii to the followers 58 causing the lever 56 to further pivot in a counterclockwise direction. The cleanly severed end of the wire 48 is thus brought into engagement with the cleanly severed end of the wire 32 with sufficient force to effectuate a coldweld therebetween (see Fig. 6). Upon further movement of the cams, the cam 31 is rendered effective to open the jaws 12 and 13 and the cams 59, immediately thereafter, start to move the housing 33 toward the right. Inasmuch as the jaws 12 and 13 have released the wire 32, the still closed jaws 34 and 36 carry the section of wire 48 together with the section 37 welded thereto toward the right and no undue stress is exerted on the welded joint. As soon at the extensions 42 and 43 engage the stop member 47, the force of the springs 44 and 46 is overcome and the springs 37 and 38 open the jaws 34 and 36 to permit withdrawal of the welded sections 32 and 48 of wire.

It is to be understood that the above-described arrangements of apparatus and construction of elemental parts are simply illustrative of an application of principles of the invention and many other modifications may be made without departing from the invention.

What is claimed is:

1. In a power operated coldwelding machine, a frame, a first jaw housing fixed to said frame, said housing having tapered internal surfaces, a first pair of jaws positioned within said housing and having tapered surfaces cooperable with said tapered surfaces in the housing, spring means for urging said first jaws to be seated within the first housing, a second housing slidably mounted on said frame, said second housing having tapered internal surfaces, a second pair of jaws positioned within said second housing and having tapered surfaces cooperable with said tapered surfaces in the housing, a second spring means for urging said second jaws to be seated within said first housing, movable stop means for opening and closing said first jaws, a stationary stop means, means for moving said second housing to engage said second jaws with said stationary stop means to open said second jaws against the effect of said second spring means, a pair of shear members movably mounted to advance between both said jaws, and power operated cam means for cyclically moving said first stop means to clost said first jaws and actuated said moving means while operating said shear members to move in and out of a position between said first and second pairs of jaws.

2. In a power operated machine for welding the ends of two pieces of metal stock, a first pair of jaws for gripping a first piece of stock, a stationary housing for supporting said first pair of jaws, power driven cam means, means operated by said cam means for moving said first jaws to grip a piece of stock, a pair of shear members slidably mounted to a stationary housing, means actuated by said cam means for moving said shear members to shear said stock, a second pair of jaws, a movable housing for supporting said second pair of jaws, means operated by said cam means for moving said housing to cause said jaws to grip and move a second piece of stock into position to be sheared by the action of said shearing members, said cam means moving said second housing upon completion of said shearing operation into position to coldweld the second piece of stock to said first piece of stock, and said cam means being effective to release said first jaws upon completion of the welding operation, and a pair of stationary stop members adapted to be engaged by and open said second jaws, said cam means being effective to retract said housing and second jaws into position so that said second jaws engage said stop means to thereby open said jaws.

3. In an automatic coldwelding machine, a first stationary housing having a pair of movably mounted jaws therein for gripping a first wire, a second housing movable toward the first housing having a pair of movably mounted jaws therein for gripping a wire, means for holding said first jaws apart, resilient means interposed between the second jaws and the housing tending to force the second jaws together, a fixed stop member for engaging and holding the second jaws against the action of the resilient means, means acting on the second housing for holding the second jaws against the stop member to hold the second jaws open, a cam unit for moving the second housing from the stop to cause the second jaws to grip the wire and advance the gripped wire toward the first wire, means actuated by the cam unit for releasing the holding means for the first jaws to cause said jaws to grip the wire while the second wire is moved into engagement therewith to effectuate a coldweld therebetween, said cam unit opening the first jaws following the coldwelding of the wires and then moving the second housing back into engagement with the stop to open the second jaws.

4. A device for automatically welding ends of metal stock together, comprising a stationary frame having a conical internal surface, a first pair of stock-gripping jaws having conical external portions in sliding engagement with the conical internal surface in said frame and having laterally extending holes in opposing faces thereof, said jaws having lateral extensions spaced axially from the conical portions of the jaws and external to the frame, a holder slidably mounted on said frame and movable toward the first pair of jaws, a second pair of stock-gripping jaws having conical external surfaces in sliding contact with the conical internal surface of said holder and having laterally extending holes in opposing faces thereof, said second jaws having lateral extensions thereon spaced axially from the conical surfaces of the jaws and external to the holders, spring-biased pins slidably mounted in the opposing holes of each pair of jaws, a first resilient means mounted on the frame between the movable jaw holder and the stationary jaw holder, a second resilient means of lesser force than the first resilient means mounted between the laterally extending portions of the jaws and the holders, a stationary stop extending from the frame to limit axial motion of the second pair of jaws, stock-shearing means slidably mounted on the frame, and a plurality of cams actuated from a power source to sequentially actuate the gripping and shearing members of the device through a predetermined cycle.

5. A device for automatically welding ends of metal stock together, comprising a stationary frame having a conical internal surface, a jaw holder slidably mounted on said frame, spring-biased means for urging the jaw holder away from the frame, said holder having an internal conical surface facing the internal conical surface of the frame, a first pair of jaws having conical external surfaces slidably mounted in and complementing the internal surfaces of the frame, a second pair of jaws having conical external surfaces slidably mounted in and complementing the internal surfaces of the holder, each of said jaws having lateral portions extending therefrom and spaced axially from the conical surfaces and externally to the holder and frame respectively, said pairs of jaws having laterally extending holes in internal opposing faces thereof, resilient means positioned between one pair of lateral jaw projections and the holder and between the other pair of lateral jaw projections and the frame, a stationary jaw stop affixed to the frame, means pivotally mounted to the frame to control the movement of said first pair of jaws relative to the frame, shearing means slidably mounted on said frame to move between the opposing jaws, cam followers linked to the moving elements, and cam means for actuating the followers according to a predetermined sequence.

6. A device for automatically welding ends of metal stock together, comprising a stationary frame having a conical internal surface, a jaw holder having an internal conical surface therein and slidably mounted on said frame, means for resiliently urging the jaw holder from the portion of the frame having the internal conical surface, a first pair of jaws having conical external surfaces slidably mounted in and complementing the internal surface of the frame, a second pair of jaws having conical external surfaces slidably mounted in and complementing the internal surface of the holder, said jaws having lateral extensions thereon and opposing holes on the opposing internal surfaces of the jaws, spring-biased pins spanning opposing holes of said jaws, resilient means positioned between one pair of lateral jaw projections and the holder and between the other pair of lateral jaw projections and the frame, a stationary jaw stop extending from the frame and against the jaws in the movable holder, actuating means pivotally mounted to the frame, shearing means slidably mounted on said frame to move between the opposing jaws, cam followers linked to the shearing and gripping elements, and cam means for actuating the cam followers according to a predetermined sequence.

References Cited in the file of this patent

UNITED STATES PATENTS

| Number | Name | Date |
|---|---|---|
| 59,464 | Seward | Nov. 6, 1866 |
| 110,179 | Williams | Dec. 13, 1870 |
| 198,077 | Bugbee | Dec. 11, 1877 |
| 1,261,084 | Wilcox | Apr. 2, 1918 |
| 1,425,359 | Barry | Aug. 8, 1922 |
| 1,457,307 | Kerns | June 5, 1923 |
| 1,464,434 | Ljungstrom | Aug. 7, 1923 |
| 1,466,244 | Noble | Aug. 28, 1923 |
| 1,583,554 | Hoover | May 4, 1926 |
| 1,763,938 | Stoler | June 17, 1930 |
| 1,998,509 | Keith | Apr. 23, 1935 |
| 2,017,795 | Freter | Oct. 15, 1935 |
| 2,018,839 | Doughlin | Oct. 29, 1935 |
| 2,144,231 | Schwarz | Jan. 17, 1939 |
| 2,336,726 | Ferguson | Dec. 14, 1943 |
| 2,392,824 | Lytle et al. | Jan. 15, 1946 |
| 2,639,632 | Criley et al. | May 26, 1953 |
| 2,715,345 | Rozmus | Aug. 16, 1955 |
| 2,774,262 | Sowter | Dec. 18, 1956 |
| 2,779,954 | Barnes | Feb. 5, 1957 |